(12) United States Patent
Speasl et al.

(10) Patent No.: US 11,375,294 B2
(45) Date of Patent: Jun. 28, 2022

(54) INTERACTIVE BROADCAST MEDIA CONTENT PROVIDER WITH DIRECT AUDIENCE INTERACTION

(71) Applicant: ImageKeeper LLC, Las Vegas, NV (US)

(72) Inventors: Jerry Speasl, Las Vegas, NV (US); Mike Patterson, Sherman, TX (US); Marc Roberts, St. Louis, MO (US)

(73) Assignee: ImageKeeper LLC, Las Vegas, NV (US)

( * ) Notice: Subject to any disclaimer, the term of this patent is extended or adjusted under 35 U.S.C. 154(b) by 0 days.

(21) Appl. No.: 17/125,690

(22) Filed: Dec. 17, 2020

(65) Prior Publication Data

US 2021/0211781 A1    Jul. 8, 2021

Related U.S. Application Data

(60) Provisional application No. 62/949,430, filed on Dec. 17, 2019.

(51) Int. Cl.
| | |
|---|---|
| *H04N 21/845* | (2011.01) |
| *H04N 21/4385* | (2011.01) |
| *H04N 21/434* | (2011.01) |
| *H04L 9/32* | (2006.01) |
| *H04L 9/30* | (2006.01) |
| *H04N 21/858* | (2011.01) |

(52) U.S. Cl.
CPC ......... *H04N 21/8455* (2013.01); *H04L 9/30* (2013.01); *H04L 9/3239* (2013.01); *H04L 9/3247* (2013.01); *H04N 21/434* (2013.01); *H04N 21/43853* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 2013/0138967 A1* | 5/2013 | Auld | G06K 9/00899 |
| | | | 713/180 |
| 2021/0200903 A1* | 7/2021 | Singh | H04N 21/251 |
| 2021/0203508 A1* | 7/2021 | Decoux | H04L 9/3236 |

* cited by examiner

*Primary Examiner* — Omar S Parra
(74) *Attorney, Agent, or Firm* — Polsinelli (57) ABSTRACT

A server system receives a digital media asset captured by a media capture device along with a dataset associated with the digital media asset. The server system generates a modified digital media asset by overlaying or embedding a glyph that encodes information pointing to the network location of the information page onto the digital media asset. A requesting device scans the glyph from the modified digital media asset and decodes from the glyph the information pointing to the network location. The information includes a certification that the digital media and the dataset associated with the digital media asset are unaltered. The requesting device may transmit communications to the server system to indicate approval or disapproval of the digital media asset, or to edit the digital media asset. The server system receives the communication and may modify the information to reflect comments, approvals, disapprovals, or edits.

18 Claims, 9 Drawing Sheets

INTERACTIVE BROADCAST MEDIA CONTENT PROVIDER WITH DIRECT AUDIENCE INTERACTION

CROSS-REFERENCE TO RELATED APPLICATION

The present application claims the priority benefit of U.S. provisional application No. 62/949,430 filed Dec. 17, 2019 and titled "INTERACTIVE BROADCAST MEDIA CONTENT PROVIDER WITH DIRECT AUDIENCE INTERACTION," the disclosure of which is incorporated herein by reference.

BACKGROUND

Field of the Invention

The present invention generally relates to digital imaging. More specifically, the present invention relates to processing of digital images.

Description of the Related Art

As devices with integrated cameras become more common, the sharing of digital media content is also becoming more widespread. Digital media content is also being shared in more forms than ever before. However, much of the digital media content that consumers regularly access comes from sources that are not inherently trustworthy, such as individual users on social media networks or blogging platforms. Because there is no way for consumers to independently verify the authenticity of traditional digital media content, consumers of digital media content can unknowingly access falsified or edited digital media content, which can mislead consumers. Similarly, with traditional digital media content, there is no way for consumers to consistently verify or authenticate metadata, documents, annotations, or other additional information associated with the media.

SUMMARY OF THE PRESENTLY CLAIMED INVENTION

Systems and methods for processing a digital media are disclosed. A digital media capture device can be used to capture the digital media asset and integrate metadata from camera sensors. The digital media and the data associated with the digital media may be received and maintained at a cloud-based server for viewing, authorized editing, and subsequent distribution. A glyph is embedded on the digital media asset by a server, which creates a modified digital media. A display device displays the modified digital media with the embedded glyph. A requesting device scans the glyph and request the digital media asset and the information associated with the digital media asset. The digital media asset may be password protected or encrypted. The requesting device may communicate with the server by sharing news, location, or giving feedback regarding the digital media.

In one example, a method for media processing is provided. The method includes receiving a digital media asset captured by a media capture device and a dataset associated with the digital media asset. The method includes executing instructions stored in memory, wherein execution of the instructions by a processor causes the processor to generate a glyph that encodes information pointing to the network location, and generate a modified digital media asset by overlaying the glyph on the digital media asset. The method includes outputting the modified digital media asset and information for storage at the network location.

In another example, a system for media processing is provided. The system includes a transceiver, a memory that stores instructions, and a processor coupled to the memory, wherein execution of the instructions by the processor causes the processor to perform system operations. The system operations include receiving, using the transceiver, a digital media asset captured by a media capture device and information associated with the digital media asset. The system operations include generating a glyph that encodes information pointing to the network location. The system operations include generating a modified digital media asset by overlaying the glyph on the digital media asset. The system operations include outputting the modified digital media asset for storage at the network location.

In another example, a non-transitory computer-readable storage medium is provided. The non-transitory computer-readable storage medium has embodied thereon a program executable by a processor to perform a method for media processing. The method includes receiving a digital media asset captured by a media capture device and information associated with the digital media asset. The method includes generating a glyph that encodes information pointing to the network location. The method includes generating a modified digital media asset by overlaying the glyph on the digital media asset. The method includes outputting the modified digital media asset at the network location.

DETAILED DESCRIPTION

Systems and methods for processing a digital media asset are disclosed. A media capture device can be used to capture a digital media asset and integrate metadata from camera sensors as well as other ancillary device sensors. The digital media and the data associated with the digital media may be maintained at a cloud-based server for viewing, authorized editing, and subsequent distribution. A glyph is embedded on the digital media asset and shown when a content provider broadcasts the digital media on a display device. A requesting device of a viewer of the broadcast may access the digital media and its associated information using the viewer's own device to scan the glyph such that the viewer can immediately verify the authenticity of the digital media.

In some examples, a digital media asset is captured by a media capture device. A server system receives the digital media asset along with information associated with the digital media asset, such as metadata or a digital signature generated for certification that the digital media asset is authentic. The server system generates an information page based on the information associated with the digital media asset and stores the information page at a network location. The server system generates a glyph, such as a QR code, that encodes information pointing to the network location. The server system generates a modified digital media asset by overlaying or otherwise embedding the glyph onto the digital media asset. The server system outputs the modified digital media asset, for example by printing the modified digital media asset or transmitting the modified digital media asset to a display device that displays the modified digital media asset. A requesting device scans the glyph from the modified digital media asset, for example using a camera, and decodes from the glyph the information pointing to the network location. The information pointing to the network location can be referred to as a pointer to the network location. Once the requesting device decodes the information pointing to the network location, the requesting device requests the information page from the server system. The server system serves the information page to the requesting device. In some cases, the requesting device transmits communications to the server system, for example to leave a comment regarding the digital media asset, to indicate approval or disapproval of the digital media asset, or to edit the digital media asset. The server system receives the communication and modifies the information page to reflect comments, approvals, disapprovals, or edits.

Figure 1:
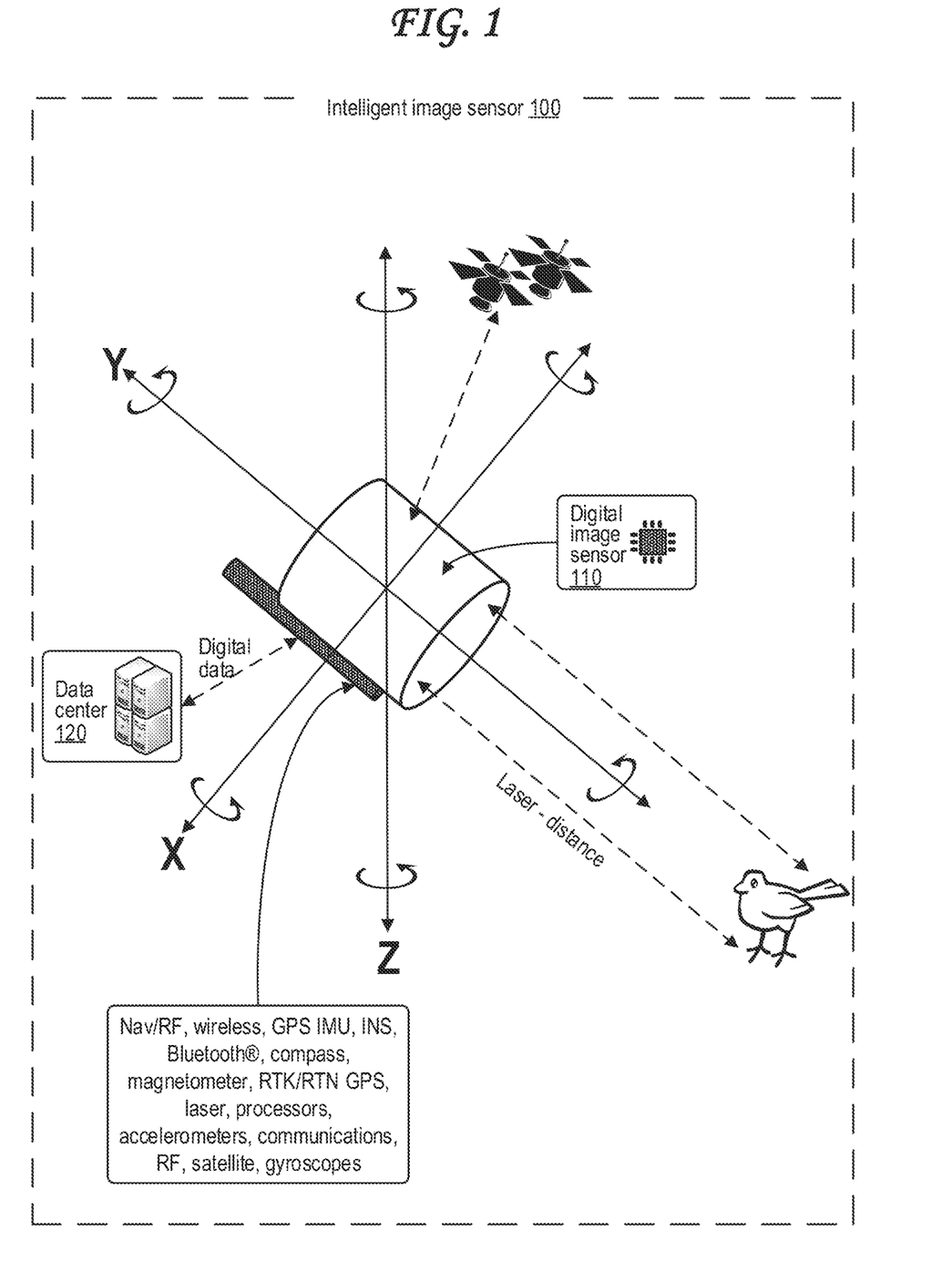
FIG. 1 illustrates an image capture system that combines a camera image with sensor data set from a sensor system.

FIG. 1 illustrates an image capture system that combines a camera image with a sensor data set from a sensor system. An exemplary sensor system is illustrated as an intelligent image sensor 100. The camera image is taken using a camera embedded as a part of an image capture device. This device can be a camera such as a digital or analog point-and-shoot camera, a digital or analog single-lens reflex "SLR" camera, a digital or analog image-capturing telescope, a digital or analog image-capturing microscope, or a digital or analog camcorder or digital image sensor system. Consumer electronic devices with imaging componentry may also be used. For example, the user device can be a portable consumer user device such as a smartphone, a tablet device, a laptop computer, a wearable device, computerized glasses, a portable gaming console, or a portable media player device. Less mobile devices may also be used such as desktop computers, television systems, gaming consoles, and various types of conveyances.

Digital image sensor 110 may capture various sensor measurements from various sensors that may be part of, or coupled to, the digital media capture device, such as the GPS coordinates where the digital media was taken, camera orientation, elevation, latitude, and altitude. Captured information may further or alternatively include the roll of the image capture device, the pitch of the image capture device, the yaw of the image capture device, the velocity and/or direction of the image capture device, the viewing angle of the image capture device, the azimuth and/or compass bearing of the image capture device. Information concerning the horizon angles of the image capture device and the inclination and declination of the image capture device may likewise be collected. Such metadata can be attached to both images, audios and videos. The captured image and the metadata may be automatically transferred directly to a secure data center 120.

Figure 2:
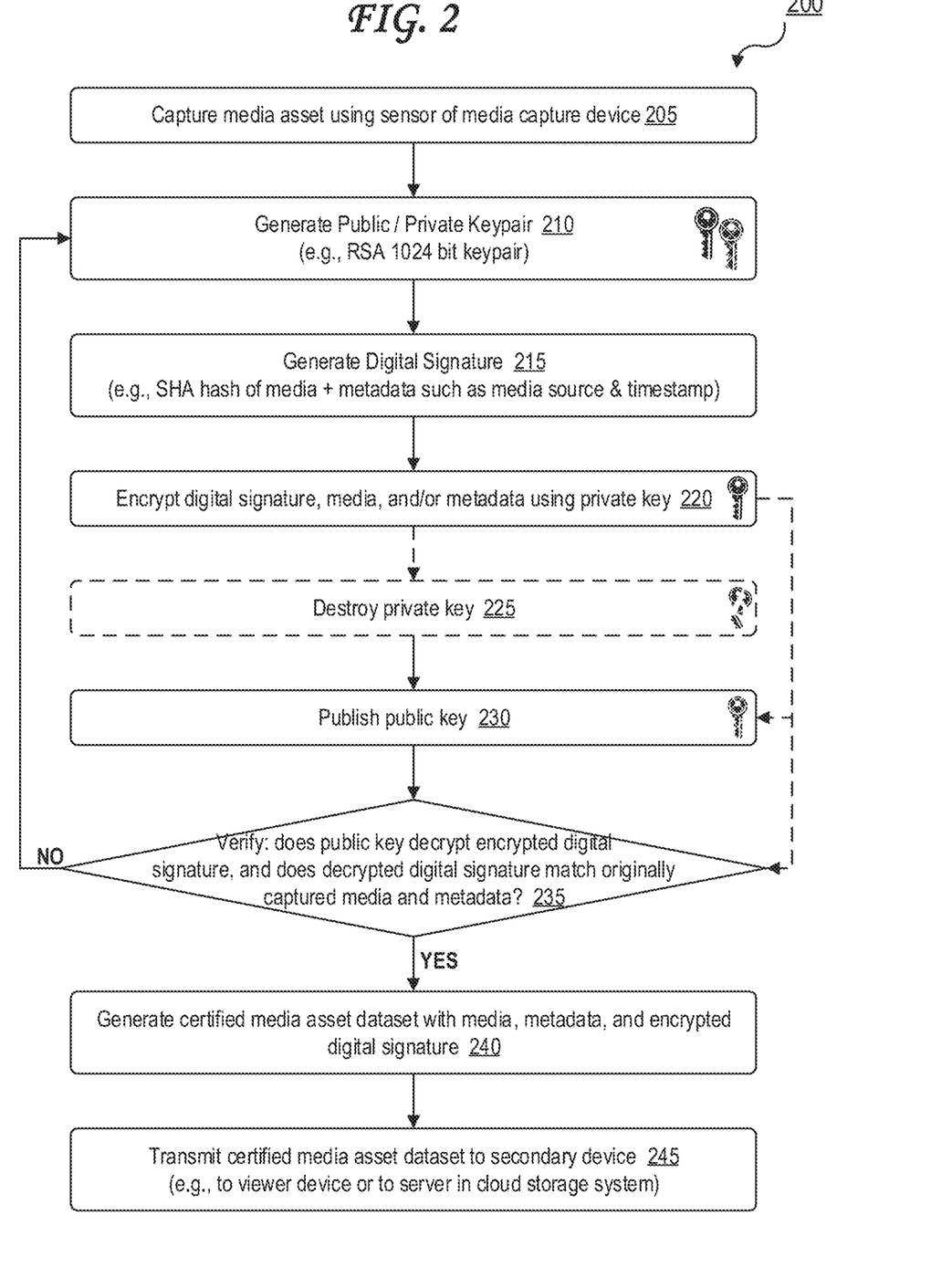
FIG. 2 is a flow diagram illustrating techniques for media certification.

FIG. 2 is a flow diagram illustrating techniques for media certification. At operation 205, a media asset is captured by a sensor of a digital media capture device, optionally with its metadata as well. The metadata may include, for example, latitude and longitude coordinates from a GNSS receiver or other positioning receiver, an identification of the media capture device, a timestamp identifying date and time of capture, an altitude at capture, a heading at capture, an inclination at capture, a yaw at capture, a roll at capture, pitch at capture, a watermark, an annotation, any other data that might be found in image EXIF metadata, elevation or altitude, velocity at capture, path, speed, direction, distance, weather conditions, barometer reading & change, dew point, humidity, sun angle, temperature, compass heading, media certification status, annotation certification status, incident note certifications status, incident report certification status, event number, time, date, time zone, title, media type (IR, multi-spectrum, RADAR, LIDAR, UV, 2-dimensionality, 3-dimensionality), wind speed, wind direction, radar data, cloud coverage, visibility, flood data, any other metadata discussed herein, or combinations thereof.

At operation 210, an asymmetric public key infrastructure (PKI) key pair—with a private key and a corresponding public key—is generated by the media capture device of operation 205 or by servers 325. In some cases, the keys of the key par may be RSA 1024 asymmetric keys. Other types of asymmetric keys may be used.

At operation 215, a digital signature is computed by generating a hash digest—optionally using a secure hash algorithm such as SHA-0, SHA-1, SHA-2, or SHA-3—of the captured media, and optionally of the metadata as well. At operation 220, the digital signature is encrypted with the private key. The media and/or metadata may also be encrypted using the private key. The private key is optionally destroyed at operation 225, or may simply never be written to non-volatile memory in the first place.

At operation 230, the public key is published, either by sending it to the servers 325, to an authentication server such as a certificate authority, or by otherwise sending it for publication in another publicly accessible and trusted network location. At operation 235, verification as to the authenticity of the media and metadata may occur by decrypting the encrypted digital signature using the public key before or after publication at operation 230, and verifying whether or not the hash digest stored as part of the decrypted digital signature matches a newly generated hash digest of the media. If the new hash matches the hash decrypted using the public key, then verification is successful, and the media asset has not been modified since capture (or at least since certification). If the new hash does not match the hash decrypted using the public key, then verification is unsuccessful, and the media asset has been modified since capture (or at least since certification). The same can be done using the metadata if a hash digest of the metadata is included in the digital signature. The verification as to the authenticity of the media and metadata at operation 235 may also include decrypting the media asset and/or the metadata itself, if either or both were encrypted at operation 220. This verification may occur at the digital media capture device—though it may instead or additionally be performed at the server 325, for example before the server 325 indexes the media as part of a cloud storage system accessible by client devices.

Once the authentication of operation 235 succeeds, a certified media dataset is generated by bundling the media, metadata, and the encrypted digital signature, for example in a zip file or other compressed archive file. The public key may also be bundled with them, though additional security may be provided by publishing it elsewhere to a trusted authentication server. At operation 245, the certified media dataset (and optionally the public key) is transmitted to a secondary device, such as a server 325 or a viewer device (i.e., a client device).

In some cases, additional data besides the media asset and associated metadata may also be certified, either or separately from the media asset or together with the certification of the media asset. If the additional data is certified together with the media asset, the hash and digital signatures at operation 215 may be hashes of the media asset as well as the additional data, thereby certifying the media asset along with the additional data. If the additional data is certified separately from the media asset, the entire process 200 may be repeated, with the additional data treated as a media asset. Additional data may include alterations or annotations to a media asset, or at least a subset of a report that is generated based on the media asset, or at least a subset of a report that is generated to include the media asset. Metadata corresponding to the additional data in some cases identifying one or more author(s) of the additional data and/or one or more devices on which the additional data was generated and/or certified, and/or from which the additional data was submitted to the server(s) 325. In some cases, a certain media asset can be associated with multiple additional data items, such as multiple notes, annotations, and/or reports by different authors, the same authors, or some combination thereof.

In other words, the operations 200 of FIG. 2 illustrate data integrity precautions that can be taken. For example, all data (e.g., media asset and/or additional data and/or metadata) can, in some embodiments, be secured in a local database with a globally unique identifier to ensure its integrity. The asset's security and integrity can be ensured via a Digital Signature that is made up of a SHA1 digest, the time that the asset was captured and the device of origin. This allows the mobile app or server to detect changes due to storage or transmission errors as well as any attempt to manipulate or change the content of the asset. The Digital Signature can be encrypted with a public/private key-pair that is generated uniquely for that asset by the media capture device. The private key can be destroyed by the media capture device and/or never written to a disk or stored in a memory of the media capture device or any other device; as such, this ensures that the asset cannot be re-signed and cannot be changed without those changes being detectable.

More specifically, media asset data, such as image, video, audio, 3D distance measurements, or other sensor data are captured by a camera, microphone, and/or other sensors integrated with the digital media capture device and/or sensors connected to the digital media capture device in a wired or wireless manner. The digital media capture device also generates and/or extracts metadata (e.g., EXIF metadata) corresponding to this captured media asset, for example identifying the digital media capture device, a timestamp of capture, a date of capture, an author or owner of the digital media capture device, and any other metadata. A digital signature is generated by generating a hash of both the captured media and at least some of this metadata. For example, the digital signature may be a hash of the captured media, the timestamp, and an identifier of the digital media capture device that captured the media. The hash may be computed using a secure hash algorithm (SHA), such as SHA-0, SHA-1, SHA-2, or SHA-3. The digital media capture device and/or a second device that receives the media asset from the digital media capture device may then generate a public and private key pair using a public key infrastructure (PKI), where the keys may be for example RSA 1024 bit keys. The private key is used to encrypt the digital signature, and may then be deleted, erased, and/or destroyed, in some cases via overwriting for more security. The certified media asset—meaning the media asset, the encrypted digital signature, and the (optionally encrypted) metadata—are uploaded to the cloud severs 325, in some cases along with the public key, optionally securely via HTTPS or another secure network transfer protocol. The public key may be uploaded to the same cloud server(s) 325 or to a different system, such as a certificate authority (CA) server. The media asset and its metadata are now certified. Any server or client can retrieve the public key from the cloud server 325 system or CA server and decrypt the encrypted digital signature to verify that it matches a new hash generated using media asset and/or metadata at a later time, thereby verifying that the media asset and metadata have not been changed since certification. The same certification process may be used for additional data based on the media asset, such as annotations, notes, and reports. In some cases, such a verification check is performed at the media capture device 305 or second device before the media asset and metadata and encrypted digital signature and public key are sent by the media capture device or second device to the server(s). In some cases, such a verification check is performed at the server(s) after receipt of the certified media asset.

Metadata may include, for example, time, location, media capture, orientation, media size, resolution, frame size, elevations, centimeter 3D GPS position, digital media capture device speed, heading, or some combination thereof.

Figure 3:
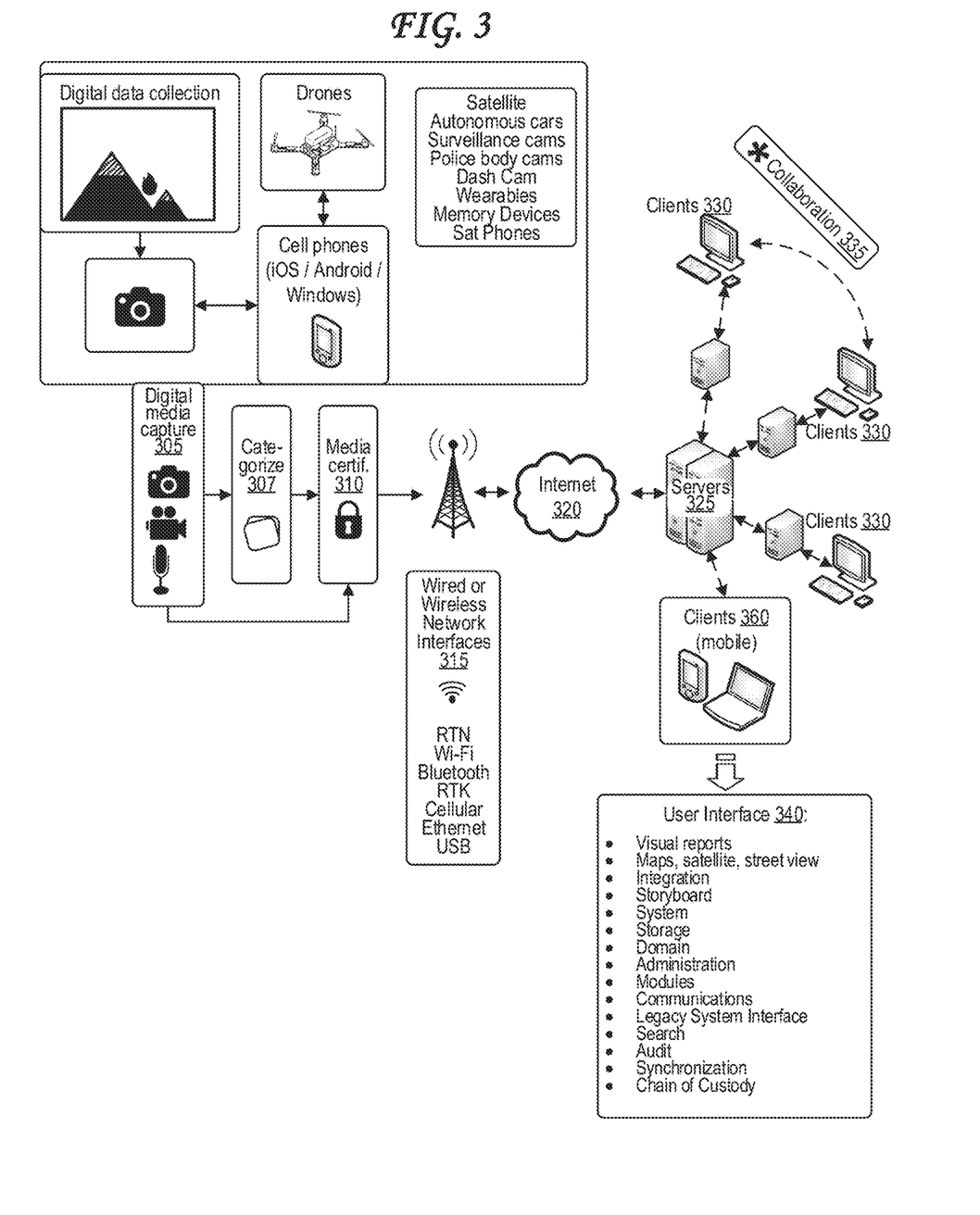
FIG. 3 illustrates a network architecture through which digital media may be captured, certified, uploaded to a server network, verified, and distributed to clients.

FIG. 3 illustrates a network architecture through which digital media may be captured, certified, uploaded to a server network, verified, and distributed to clients.

A digital media capture device 305 captures digital media, which may include one or more image(s), video(s), sensor data, or a combination thereof. The digital media capture device 305 may be a user mobile device, a drone or UAV, a vehicle, a body camera, a surveillance camera, a dash camera, a wearable device, a phone another type of device, or a combination thereof. The image and/or sensor data may be categorized at a step 307 (e.g., for example based on type of media, time, location, other metadata associated with capture of the digital media, or some combination thereof) and/or certified at a step 310 (e.g., as in the process 200 of FIG. 2). Categorization 307 and/or certification 310 may occur at the digital media capture device 305 or a second device that receives the digital media asset from the digital media capture device. In some cases, categorization 307 may be skipped.

In another example, a digital media capture device 305 can be used to capture the digital media asset, integrate metadata from one or more digital media capture device sensors and embed one or more glyphs on the digital media asset during the capture process. The digital media and the data associated with the digital media may be received and maintained at a cloud-based server for viewing, subsequent distribution, and interrogation of authenticity.

Once digital media is captured at the digital media capture device 305, categorized at step 307, and/or certified at step 310, the certified (and in some cases categorized) digital media data may be autonomously sent to one or more servers 325 by the digital media capture device or a second device that receives the digital media data from the digital media capture device. The digital media capture device and/or the second device transmits the certified (and in some cases categorized) digital media data to the servers 325 over the internet 320 using one or more wired and/or wireless networks interfaces 315, which may include cellular networks (e.g., 3G, 4G, LTE, or 5G), W-Fi, wireless local area networks (WLAN), any other wired and/or wireless network interfaces discussed herein, or a combination thereof.

Once the certified digital media data is received by the servers 325, the servers 325 store, verify, file, organize, and publish the certified digital media data so that the certified digital media data is made accessible through the internet 320 to client devices 330. The servers 325 may receive the public key transmitted at operation 245 of the process 200 and use the public key to verify that the certified digital media data is authentic and unaltered.

In some cases, the digital media capture device can first synchronize its image and/or sensor data with a second device, such as a mobile device 360 and/or a base station. For example, a camera of the digital media capture device may first synchronize its data with a user mobile device 360 (e.g., a smartphone or wearable device) or a base station, which can then transmit the certified digital media to the internet 320 and server(s) 325 of the cloud system. Other devices, such as handheld digital cameras, body cameras, and binoculars may include the digital media capture device, and/or in some cases may connect with the server(s) 325.

Figure 8:
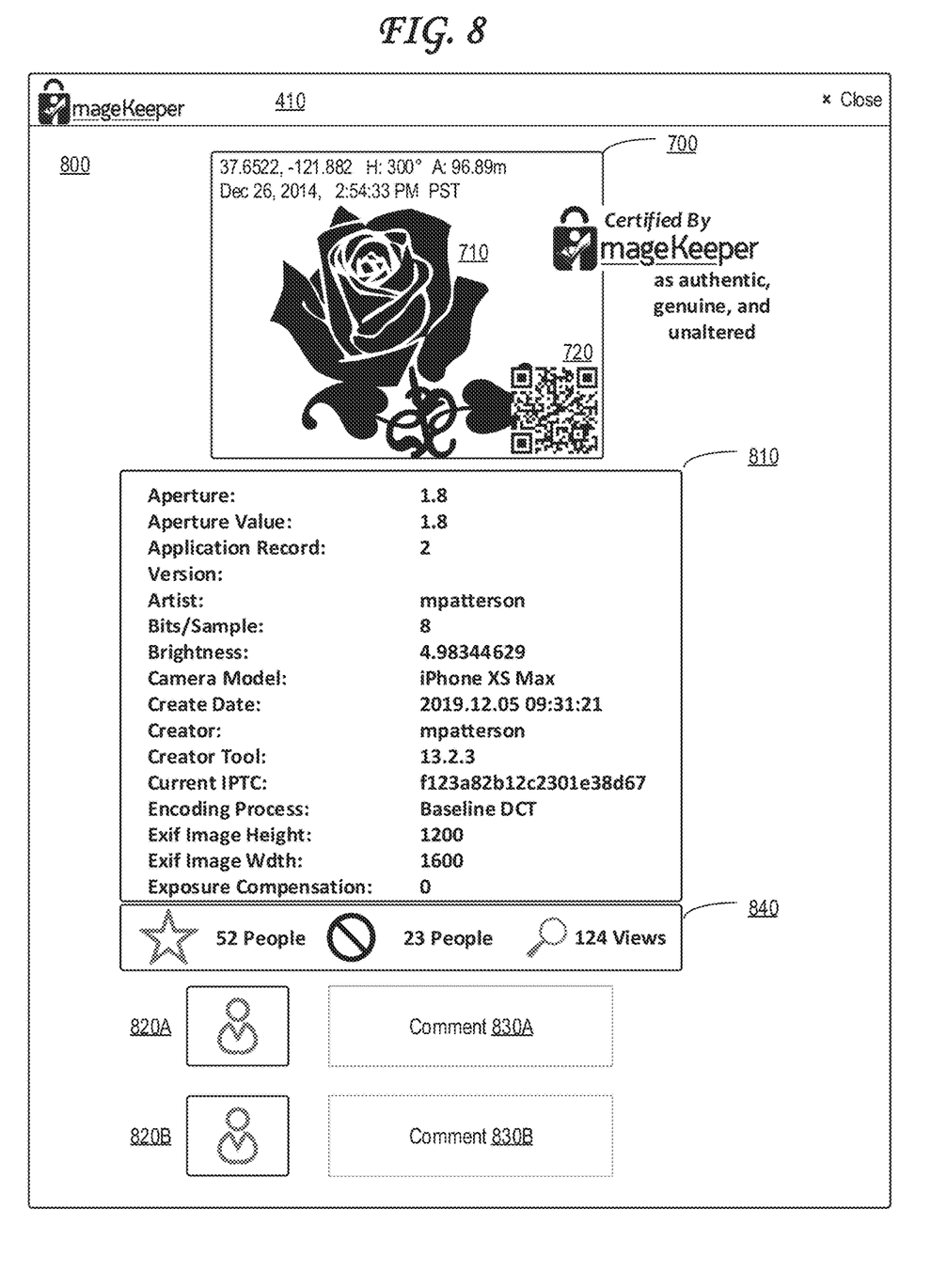
FIG. 8 illustrates an exemplary view of an information page of a viewer application.

Client devices 330 or 360 may include a user interface 740 that includes functions for visual reports, maps for satellite or street view, integration with other devices or software, storyboard, administrative functions, communication, search, audit, and functions for managing system, storage, domain, synchronization, and chain of custody to allow for collaboration 335 among devices 330 and/or 360 as further illustrated in FIG. 8.

Figure 4:
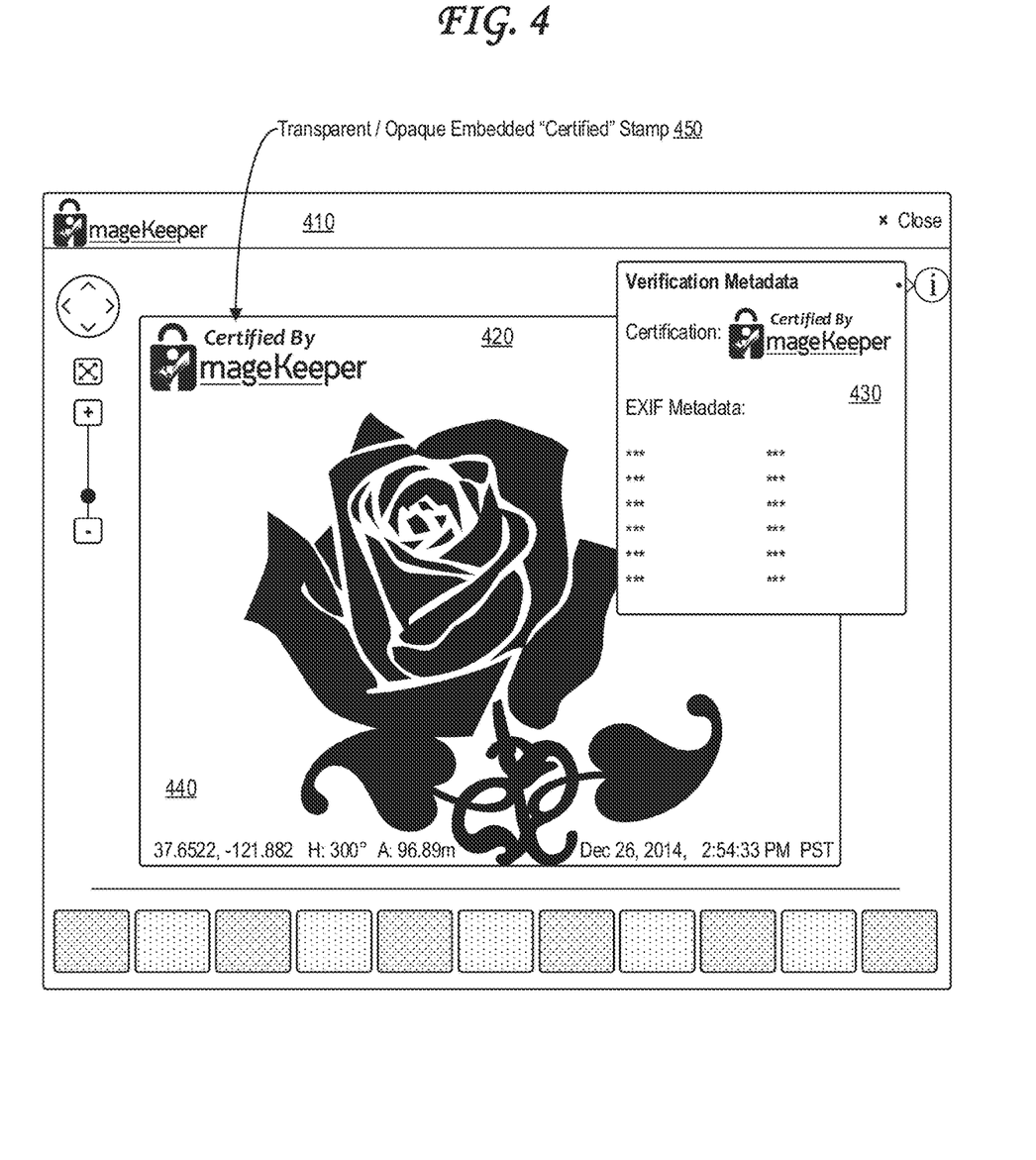
FIG. 4 illustrates an exemplary certified image within an exemplary image viewer application.

FIG. 4 illustrates an exemplary certified image within an exemplary image viewer application. The exemplary image viewer application 410 displays an image 420 and shows a "certified image" stamp or "certified by [image certifying authority]" stamp graphic 450 in the upper left corner of the image 420, signifying that the image 420 is a certified image and therefore is certified as authentic and unaltered. In the example of FIG. 4, the image certifying authority is "Image-Keeper." In some examples, a different image certifying authority may be identified. The exemplary image viewer 410 also shows some image metadata along the bottom 440 of the image 420 and additional metadata in a metadata viewing box 430 on the right-hand side of the image 420. The bottom 440 of the image 420 may include geospatial metadata, such as heading angle, latitude, longitude, altitude, etc. The bottom 440 of the image 420 may further include the time and date of the digital media capture. This metadata is also certified as part of the certification process, and may in some cases also be marked with a "certified image" stamp or "certified by [image certifying authority]" stamp graphic itself to signify that it, too, is certified as authentic and unaltered.

Figure 5:
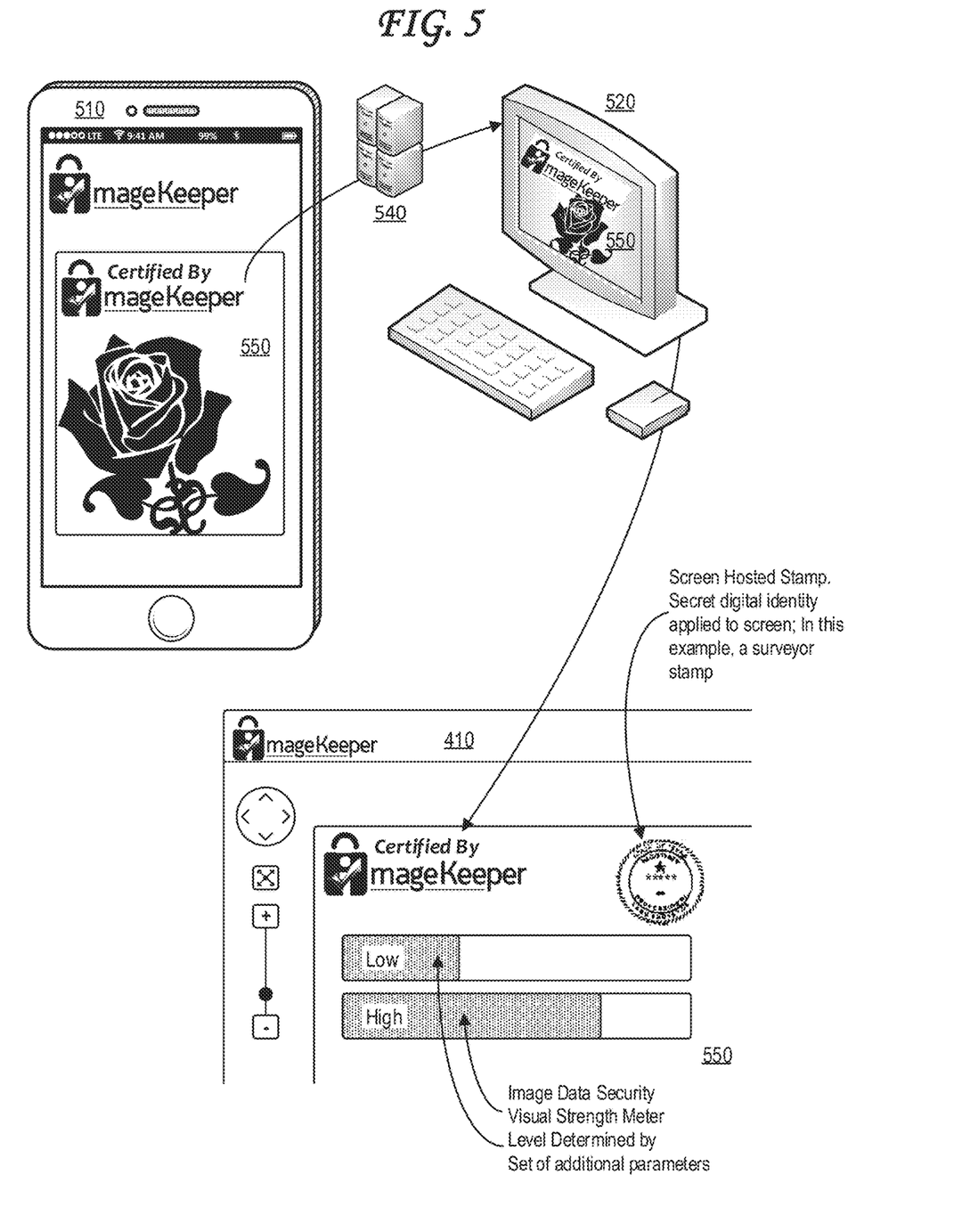
FIG. 5 is a flow diagram illustrating an exemplary operation of the intelligent image certification system.

FIG. 5 is a flow diagram illustrating an exemplary operation of the intelligent image certification system. In particular, a media capture device 510 captures an image 550 and certifies the image 550 upon capture. During the capture, the metadata associated with the capture of the image 550 may be displayed on the media capture device 510. For example, while the media capture device 510 is pointed at an object to be captured, the geospatial information and date and time of capture may be displayed in real-time on the media capture device 510 and updated as the media capture device 510 is moved in location or as time passes. The media capture device 510 may display the object to be captured and the sensor and metadata associated with the capture simultaneously during the capture of the digital media asset. The certified image 550 is transferred, optionally through the server(s) 540, to a viewer device 520, which views the certified image 550 in a viewer application 410. The viewer application 410 may display meters corresponding to image data security levels, for instance identifying a degree of confidence in the authenticity and unaltered nature of the certified image 550.

Figure 6:
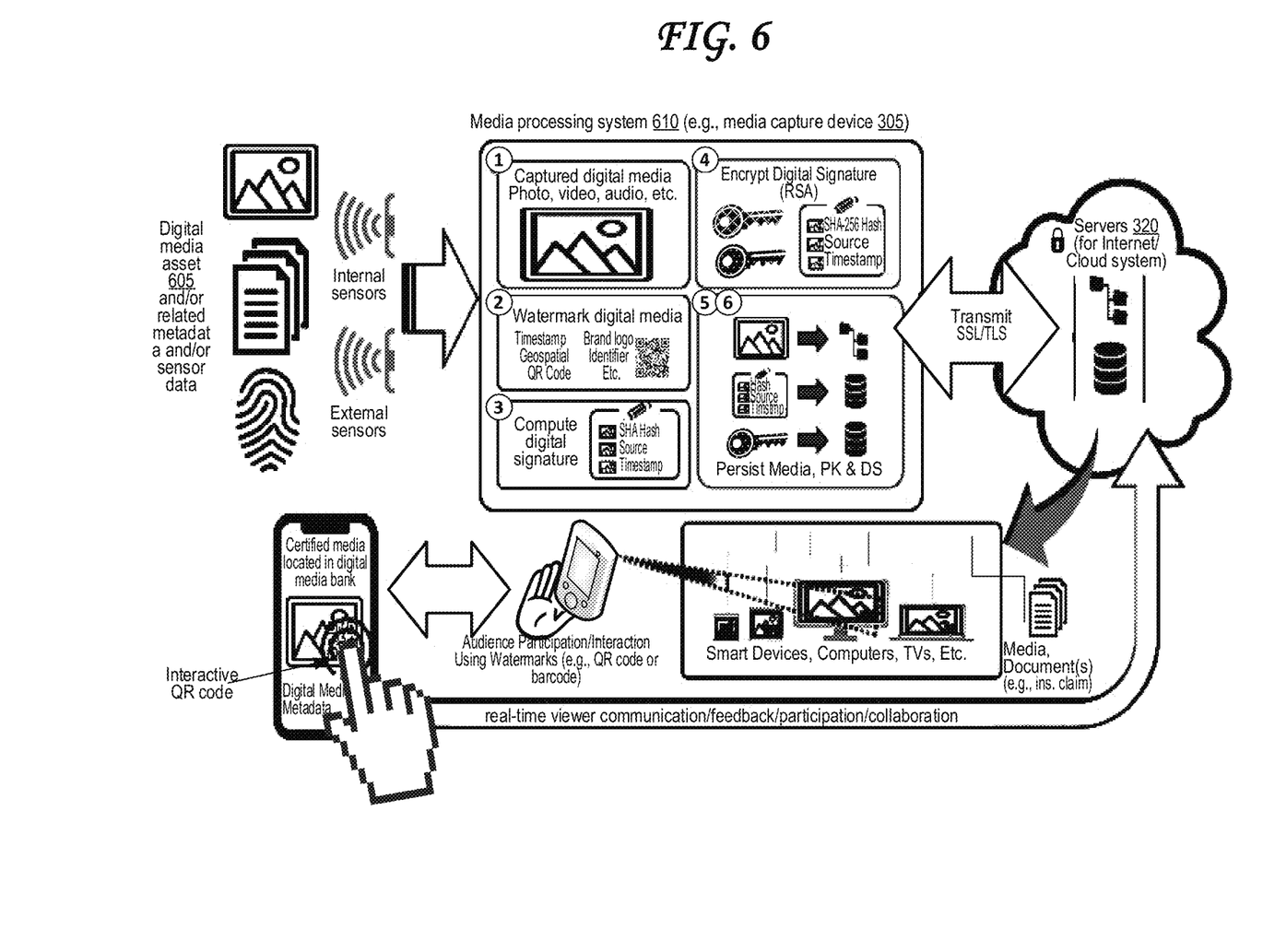
FIG. 6 is a flow chart of the image processing system.

FIG. 6 is a flow chart of image processing system. A digital media asset captured by a digital media capture device, such as an image captured by a camera, is received by the media processing system (e.g., server system 325 of FIG. 3). The digital media asset may be in the form of image data, audio data, video data, RADAR data, LIDAR data, SONAR data, SODAR data, sensor data from one or more other sensors, or some combination thereof. The media processing system may also receive metadata related to the digital media asset. The metadata may include location, orientation, navigation attributes, orientation of the media capture device, time of the capture, date of capture, photographer, identity of the digital media capture device, owner of the digital media capture device, sensor data from one or more other sensors coupled to the digital media capture device, or some combination thereof.

When the digital media asset 605 and its metadata are captured by the digital media capture device 305, the digital media asset and its metadata are autonomously certified (as in FIG. 2) and sent by the digital media capture device 305 to the internet/cloud system where the digital data is filed, stored, and accessed through the web in a systematic or serialized format. The system generates an information page based on the information associated with the digital media asset on a network location. The internet/cloud system can include one or more server systems, which may be connected to each other. In some cases, this internet/cloud system is a wireless multiplexed system for securely storing digital data to and from mobile digital devices. In some cases, the digital data (e.g., images, reports) are securely held in one central place, either by a hardware memory device, server, or a data center.

In another example, a digital media capture device can be used to capture the digital media asset, integrate metadata from one or more digital media capture device sensors and embed one or more glyphs on the digital media asset during the capture process. The digital media and the data associated with the digital media may be received and maintained at a cloud-based server for viewing, subsequent distribution, and interrogation of authenticity.

The digital media asset 605 is embedded with a glyph that encodes information pointing to the internet/cloud system. This glyph can be a quick response (QR) code. The glyph can also be a barcode, Aztec code, brand logo, URL, and/or MaxiCode or other identifier in addition to or instead of the QR code. The information pointing to the internet/cloud system can encode or otherwise include a URL. The system then generates a modified digital media asset by overlaying the glyph on the digital media asset 605.

The embedded glyph on the digital media asset is shown when a content provider broadcasts the digital media asset on a display device or one or more social platforms. A requesting device scans the glyph from the displayed digital media asset, for example using a camera, and decodes from the glyph information pointing to a network location. Once the requesting device decodes the information pointing to a network location, the requesting device requests the digital media asset information from the server system. The server system searches for the digital media asset, executes instructions to validate the digital media authenticity, serves a dynamically generated information page containing the original certified authentic digital media asset along with any persisted information, including any metadata, to the requesting device for viewing or enabling interaction between the viewer and the server system.

Once the digital data is in the internet or cloud system, the digital media asset 605 may be protected through a various technologies and system controls. Security, digital signature, watermarking, encryption physical access, password credentials area can be utilized throughout the system. Original digital data can be confirmed, saved and protected though various technologies and system controls. The system may generate a hash digest of the digital media asset and a unique key pair corresponding to the digital media asset. The unique key consists of a private key and a public key, in which the private key is used to encrypt both the hash digest and the metadata. The public key may be transmitted to a network server. The information pointing to the network location may require a passcode to access the digital data.

A content provider (e.g., the servers 325 or a device that retrieves the modified digital media dataset and/or information page from the servers 325 or the media capture device 305) may broadcast the information regarding the digital media by displaying the media as well as the glyph associated with the media during its broadcast on a display device. The content provider may be television network, radio channel, newspaper, or magazine publisher. Viewers of the broadcast may request to access the digital media and its associated information by scanning the glyph from the broadcast with the viewer's device. This data can be transferred over a wired or a wireless connection. When requested to provide the digital media data, the system may generate a decrypted signature by decrypting the digital signature using the public key, generate a hash based on the digital media asset, and verify that the hash matches the decrypted signature.

In one embodiment, when a viewer of the broadcast requests this information, the viewer may be shown the information page corresponding to the digital media asset. In another embodiment, the viewer may be prompted to provide a passcode to access the information page containing the digital media asset and its metadata. The information page may include a certification that the digital media asset is unaltered based on the hash matching the decrypted signature.

Figure 7:
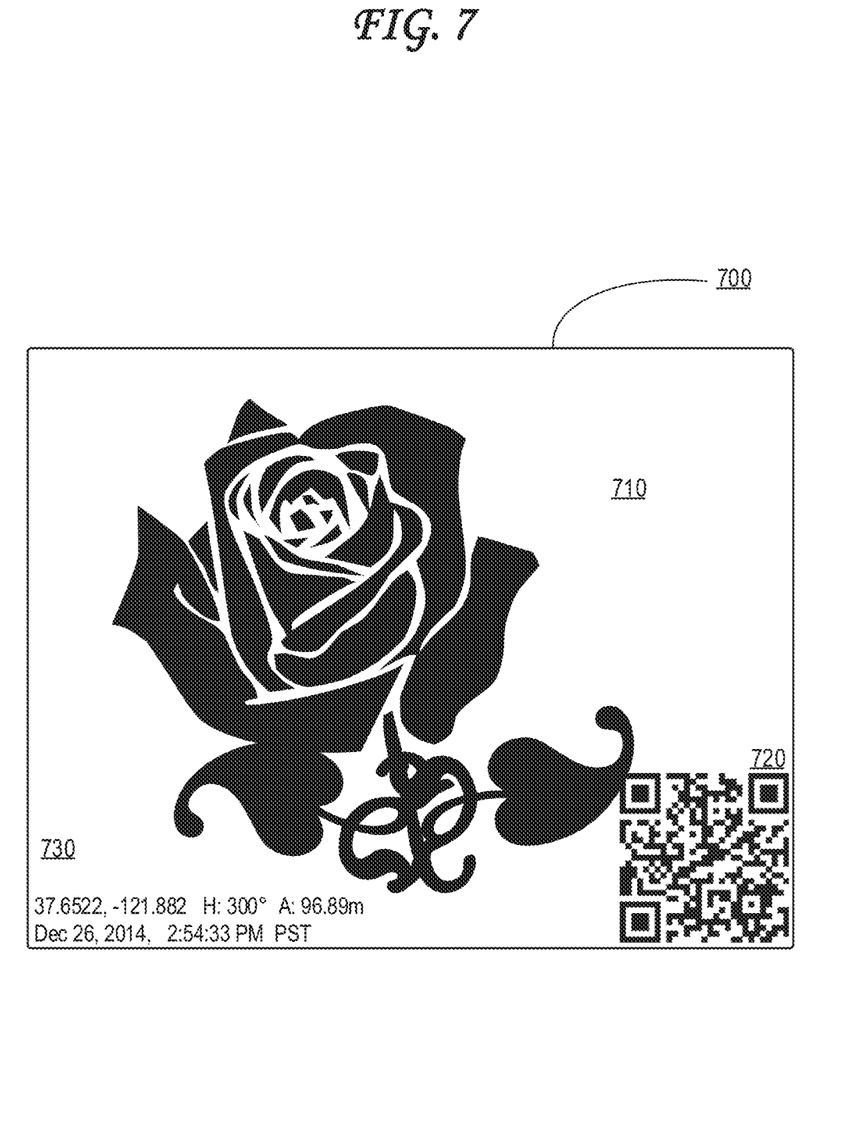
FIG. 7 illustrates a modified version of a digital media asset with an overlaid glyph.

FIG. 7 illustrates a modified version 700 of a digital media asset 710 with an overlaid glyph. The digital media asset 710 is illustrated in FIG. 7 as an image. In another embodiment, the digital media asset 710 may be a document, which may include texts or a combination of images and texts. The server system 325 generates the glyph 720 to encode information identifying a network location, such as a Uniform Resource Locator (URL) of the network location, of an information page associated with the digital media asset 710 (e.g., the information page 800 illustrated in FIG. 8). The server system 325 generates the modified digital media asset 700 by generating a glyph 720 and overlaying the glyph 720 on at least a portion of the digital media asset 710, or by otherwise embedding the glyph 720 into the digital media asset 710. The certified digital media asset 710 may also be modified by overlaying certain metadata 730 over the digital media asset 710. In some examples, the glyph 720 is overlaid over a portion of the digital media asset 710 without modifying the digital media asset 710. For instance, the glyph 720 can be a separate layer than the digital media asset 710 and can be moved relative to the digital media asset 710.

In some examples, the glyph 720 is positioned adjacent to or near the digital media asset 710 without being overlaid over the digital media asset 710.

The glyph 720 is overlaid over the bottom right of the digital media asset 710 in the example illustrated in FIG. 7. The glyph 720 is illustrated as a quick response (QR) Code. A requesting device may interact with this glyph 720 by scanning the QR Code with a camera or other scanner of the requesting device. For instance, the requesting device may be a smart phone or tablet with a QR Code scanner that scans the glyph 720. The requesting device may decode the glyph to obtain the network location (e.g., the URL) of the information page. The requesting device may "go to" the network location using a browser or other application running on the requesting device. To go to the network location, the requesting device can request the information page from the servers 325. The servers 325 can provide the information page to the requesting device in response to the request, and in some examples also in response to successful identification and/or authentication of the requesting device and/or the user of the requesting device (e.g., by verifying device ID of the requesting device, a username of the user, a password of the user, and/or other identifying information).

In another embodiment, the requesting device scanning the glyph 720 is directed to the URL where the digital media asset is stored. The requesting device accessing the URL can cause a digital media bank (e.g., the server system 325) to search for the associated digital media asset, perform the authenticity verification, and output the digital media asset and an information page to the requesting device.

In some cases, the modified digital media asset 700 may also include a hyperlinked text or region of the digital media asset (e.g., as part of the glyph 720 or adjacent to the glyph 720), so that a user viewing the modified digital media asset on a device can click or tap the hyperlinked text or region to go to the network location (e.g., URL) of the information page even without a camera or QR code scanner. In some cases, the QR code may be the hyperlinked region of the modified digital media asset.

In some other cases, scanning the glyph 720 may trigger an option to initiate an authenticity analysis of the digital media asset 710 by a viewer device. Scanning the glyph 720 may also trigger an authenticity analysis of the metadata, geospatial data, digital signature, pixel variation, or other data associated with the digital media asset 710. The results from the authenticity analysis may be displayed on the viewer device to indicate whether the digital media asset 710 or the data associated with the digital media asset 710, such as digital signature, pixel variation, metadata, or geospatial data are authentic or showing no pixel variation.

For example, the authenticity analysis of pixel variation in the digital media asset 710 can, for instance, compare the pixels in the digital media assets to the pixels in an encrypted copy of the digital media asset received from the media capture device, which may be decrypted using a public key upon receipt by the server system 325. In another example, the authenticity analysis of metadata and/or geospatial data in the image may compare the metadata and/or geospatial data of the digital media asset 710 to an encrypted copy of the metadata and/or geospatial data received from the media capture device, which may be decrypted using a public key upon receipt by the server system 325. The overall result may be based on a combination of the previously described analyses, and for instance identify a percentage of the analyses indicating successful authentication and/or a percentage of the analyses indicating failed authentication.

In some examples, a viewer or administrator may set permissions at the server 325 so that only certain requesting devices may be able to access the information page. For example, certain device IDs of requesting devices can be whitelisted or blacklisted at the server 325 from being served the information page by the server system 325. The server system 325 may request a username and/or password from the requesting device, and requesting devices using certain usernames and/or passwords can be whitelisted or blacklisted at the server system 325 from being served the information page by the server system 325.

FIG. 8 illustrates an exemplary view of an information page 800 of the viewer application. The information page 800 may be displayed using the viewer application 410 on a client device (e.g., client device 330 and/or 360). For example, the information page 800 may be displayed using the viewer application 410 on the client device after scanning the glyph 720 of FIG. 7 with a camera associated with the client device. The client device may decode, from the glyph 720, information pointing to the network location (e.g., a URL) where the information page 800 associated with the digital media 710 is stored. The network location can be password-protected, in which case the client device may be served access the information page 800 by the server system 325 after sending a username and/or password to the server system 325. The server system 325 may serve the information page to the client device. The information page 800 may be referred to as the information 800.

The information page 800, in the example illustrated in FIG. 8, includes a copy of the modified digital media asset 700, including the image 710 with the glyph 720 overlaid. The information page 800 can also include information 810, such as sensor and metadata information associated with the digital media 710 and/or with capture of the digital media 710. For example, the information page 800 can include information 810 such as the location the digital media asset 710 was captured and/or created, an identifier identifying the user who captured and/or created the digital media asset 710, a date of capture and/or creation of the digital media asset 710, a timestamp of the capture and/or creation of the digital media asset 710, or combinations thereof. The information page 800 can include information 810 identifying camera settings using during capture of the digital media asset 710, such as aperture size, exposure time, shutter speed, ISO speed, HDR mode, focus, flash, digital gain, analog gain, white balance, image processing settings, or combinations thereof. The information page 800 can include information 810 such as application record, version number, artist or author, brightness, camera model, creator tool, current IPTC, encoding process, image height, image width, or a combination thereof. Any combination of the above-recited types of information 810 may be part of the information page 800 that is displayed in the viewer application 410 along with the digital media 710 or modified digital media 700.

Further, information 810 may include a result of authenticity analysis of the digital media asset 710 and/or the authenticity analysis of the data associated with the digital media asset 710, such as digital signature, pixel variation in the digital media asset, metadata, geospatial data, an overall result, or a combination thereof, as described in FIG. 7.

In some examples, viewers, such as a first viewer 820A and a second viewer 820B, can interact with the digital media asset 710 and associated information 810. In some examples, the first viewer 820A can refer to a first viewer device associated with the first viewer 820A, and the second viewer 820B can refer to a second viewer device associated with the first viewer 820B. In some examples, the first viewer 820A can refer to a first viewer account associated with the first viewer 820A, and the second viewer 820B can refer to a second viewer account associated with the first viewer 820B. In some examples, the first viewer 820A and the second viewer 820B refer to client devices, such as client devices 330 and/or 360 of FIG. 3. In some examples, the first viewer 820A and the second viewer 820B refer to viewer devices, such as viewer device 520 of FIG. 5. Viewer habits may be compiled from the views. For example, the server system 325 can store the number of views of the digital media asset 710 by each viewer. Viewer habits may allow the content provider to learn the viewer's favorite channels or the viewing times. Each viewer may interact with the information page 800 by providing an input. For instance, the input provided by the viewer may be a comment, news, location, events, incidents, media, or feedback regarding the digital media 710. The server system 325 may receive the input transmitted from the viewers 820A-820B regarding each viewer's interaction with the digital media 710, and may update the information page 800 to identify the input along with other inputs and/or feedback from other viewers.

For example, FIG. 8 illustrates that viewer 820A and viewer 820B have left comment 830A and comment 830B respectively, regarding the digital media 710, the information 810, and/or anything else on the information page 800. Moreover, FIG. 8 illustrates viewer data 840 of the digital media 710, which displays that 52 viewers have approved or expressed positive opinion of the digital media 710 and 23 viewers have disapproved or expressed negative opinion the digital media 710. The approval and disapproval numbers may correlate with the opinions of the viewers 820A-B regarding the authenticity of the digital media 710, with a high number of approval indicating that the digital media 710 is authentic. The view data 840 may also indicate the total number of views of the digital media asset 710 viewed by different viewers 820A-B. All of these may be referred to as inputs by the viewers 820A-B. In some embodiments, the information page 800 may allow viewers 820A-B to edit the digital media asset 710. Such edits to the digital media asset by viewers 820A-B may be logged. A chain of custody and a chain of modifications/edits may be stored in the secure server 325, any other remote servers, or in a distributed ledger, such as blockchain.

The presently disclosed invention may be implemented in the general context of computer executable instructions via software located on and between a remotely operated user device (e.g., Smartphone, tablet, or other electronic device) with a computerized operating system. There may be multiple user devices interacting with a web portal, which may be local or may be geographically separated. The user devices may be remotely addressable with secure login, with or without password, biometric fingerprint, voice, retinal scan or encrypted log on web portal providing global internet access, either via fiber, radio frequency, satellite, or data linking with bi-directional, cloud system and or data center or location under user command.

The web portal and/or viewer device mobile application can include annotation tools, allowing for creation of charts and graphics with color annotation incorporating picture in picture, with image numbers associated with each image brought into the web portal workspace. In addition to annotation tools, any interface with all of the external data inputs, such as weather, news, Internet sites, other sensor data can be integrated into the workspace and integrated into the image work areas.

Figure 9:
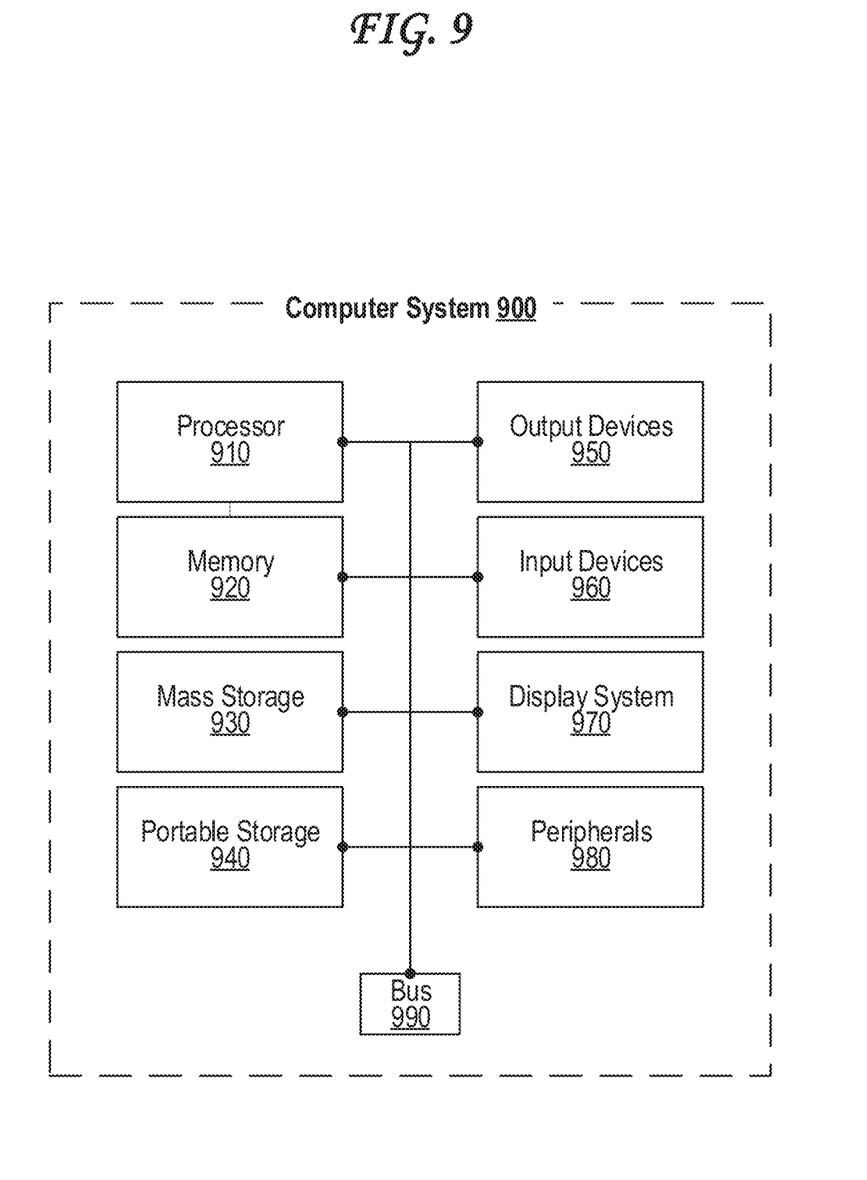
FIG. 9 illustrates an exemplary computing system that may be used to implement some aspects of the technology.

FIG. 9 illustrates an exemplary computing system 900 that may be used to implement some aspects of the technology. For example, the digital media capture device, the servers 325, the client devices 330, the client devices 360, the media capture device 510, the viewer device 520, as well as any other computing devices, computing systems, network devices, network systems, servers, and/or arrangements of circuitry described herein may include at least one computing system 900, or may include at least one component of the computer system 900 identified in FIG. 9. The computing system 900 of FIG. 9 includes one or more processors 910 and memory 920. Each of the processor(s) 910 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 910 may include one or more cores, either integrated onto a single chip or spread across multiple chips connected or coupled together. Memory 920 stores, in part, instructions and data for execution by processor 910. Memory 920 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and memory 920 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing some aspects of the subject technology for purposes of loading that software into memory 920.

Portable storage device 940 operates in conjunction with a portable non-volatile storage medium, such as a floppy disk, compact disk or Digital video disc, to input and output data and code to and from the computer system 900 of FIG. 9. The system software for implementing aspects of the subject technology may be stored on such a portable medium and input to the computer system 900 via the portable storage device 940.

The memory 920, mass storage device 930, or portable storage 940 may in some cases store sensitive information, such as transaction information, health information, or cryptographic keys, and may in some cases encrypt or decrypt such information with the aid of the processor 910. The memory 920, mass storage device 930, or portable storage 940 may in some cases store, at least in part, instructions, executable code, or other data for execution or processing by the processor 910.

Output devices 950 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 970. The printer may be inkjet, laserjet, thermal, or some combination thereof. In some cases, the output device circuitry 950 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 950 may include any ports, plugs, antennae, wired or wireless transmitters, wired or wireless transceivers, or any other components necessary for or usable to implement the communication types listed above, such as cellular Subscriber Identity Module (SIM) cards.

Input devices 960 may include circuitry providing a portion of a user interface. Input devices 960 may include an alpha-numeric keypad, such as a keyboard, for inputting alpha-numeric and other information, or a pointing device, such as a mouse, a trackball, stylus, or cursor direction keys. Input devices 960 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 960 may include any ports, plugs, antennae, wired or wireless receivers, wired or wireless transceivers, or any other components necessary for or usable to implement the communication types listed above, such as cellular SIM cards.

Input devices 960 may include receivers or transceivers used for positioning of the computing system 900 as well.

These may include any of the wired or wireless signal receivers or transceivers. For example, a location of the computing system 900 can be determined based on signal strength of signals as received at the computing system 900 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 900 such as a router, modem, switch, hub, bridge, gateway, or repeater. These may also include Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 960 may include receivers or transceivers corresponding to one or more of these GNSS systems.

Display system 970 may include a liquid crystal display (LCD), a plasma display, an organic light-emitting diode (OLED) display, a low-temperature poly-silicon (LTPO) display, an electronic ink or "e-paper" display, a projector-based display, a holographic display, or another suitable display device. Display system 970 receives textual and graphical information, and processes the information for output to the display device. The display system 970 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 980 may include any type of computer support device to add additional functionality to the computer system. For example, peripheral device(s) 980 may include one or more additional output devices of any of the types discussed with respect to output device 950, one or more additional input devices of any of the types discussed with respect to input device 960, one or more additional display systems of any of the types discussed with respect to display system 970, one or more memories or mass storage devices or portable storage devices of any of the types discussed with respect to memory 920 or mass storage 930 or portable storage 940, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 900 of FIG. 9 can include those found in computer systems that may be suitable for use with some aspects of the subject technology and represent a broad category of computer components. That said, the computer system 900 of FIG. 9 can be customized and specialized for the purposes discussed herein and to carry out the various operations discussed herein, with specialized hardware components, specialized arrangements of hardware components, and/or specialized software. Thus, the computer system 900 of FIG. 9 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 900 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pfSense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 900 may also use a Basic Input/Output System (BIOS) or Unified Extensible Firmware Interface (UEFI) as a layer upon which the operating system(s) are run.

In some cases, the computer system 900 may be part of a multi-computer system that uses multiple computer systems 900, each for one or more specific tasks or purposes. For example, the multi-computer system may include multiple computer systems 900 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 900 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 920, the mass storage 930, the portable storage 940, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L9), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 910 for execution. A bus 990 carries the data to system RAM or another memory 920, from which a processor 910 retrieves and executes the instructions. The instructions received by system RAM or another memory 920 can optionally be stored on a fixed disk (mass storage device 930/portable storage 940) either before or after execution by processor 910. Various forms of storage may likewise be implemented as well as the necessary network interfaces and network topologies to implement the same.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

While the flow diagrams show a particular order of operations performed by certain embodiments of the invention, it should be understood that such order is exemplary. Alternative embodiments can perform the operations in a different order, combine certain operations, and overlap certain operations.

What is claimed is:

1. A method of media processing, the method comprising:
receiving a digital media asset captured by a media capture device and a dataset associated with the digital media asset;
executing instructions stored in memory, wherein execution of the instructions by a processor in the media capture device causes the processor to:
generate a glyph that encodes a pointer to a network location, and
generate a modified digital media asset by overlaying the glyph on the digital media asset;
output the modified digital media asset and information for storage at the network location;
receive an indication that a requesting device has requested access to the information that is stored at the network location using the pointer encoded in the glyph of the modified digital media asset in response to output of the modified digital media asset;
receive feedback regarding the digital media asset from the requesting device in response to the requesting device accessing the information that is stored at the network location; and
cause the information to be updated based on the feedback regarding the digital media asset that is received from the requesting device.

2. The method of claim 1, further comprising:
receiving a passcode from the requesting device, wherein serving the information to the requesting device occurs in response to verification of the passcode.

3. The method of claim 1, wherein the dataset associated with the digital media asset includes metadata associated with capture of the digital media asset.

4. The method of claim 1, wherein execution of the instructions by the processor causes the processor to:
generate a decrypted signature by decrypting an encrypted digital signature using a key, wherein the dataset associated with the digital media asset includes the encrypted digital signature,
generate a hash based on the digital media asset, and
verify that the hash matches the decrypted signature.

5. The method of claim 4, further comprising receiving the key, wherein the key is a public key corresponding to the digital media asset, wherein the encrypted digital signature is encrypted by a private key corresponding to the public key.

6. The method of claim 4, wherein the information includes a certification that the digital media asset is unaltered based on the hash matching the decrypted signature.

7. The method of claim 1, wherein the digital media asset includes image data.

8. The method of claim 1, wherein the glyph includes a quick response (QR) code.

9. The method of claim 1, wherein the pointer to the network location includes a Uniform Resource Locator (URL) pointing to the network location.

10. The method of claim 1, further comprising:
serving the information to a second requesting device after updating the information.

11. The method of claim 1, further comprising:
verifying that the requesting device has permission to access the information based on a device identifier of the requesting device.

12. A system that processes media, the system comprising:
a transceiver;
a memory that stores instructions; and
a processor coupled to the memory, wherein execution of the instructions by the processor causes the processor to:
receive, using the transceiver, a digital media asset captured by a media capture device and a dataset associated with the digital media asset,
generate a glyph that encodes a pointer to a network location,
generate a modified digital media asset by overlaying the glyph on the digital media asset;
output the modified digital media asset and information for storage at the network location;
receive an indication that a requesting device has requested access to the information that is stored at the network location using the pointer encoded in the glyph of the modified digital media asset in response to output of the modified digital media asset;

receive feedback regarding the digital media asset from the requesting device in response to the requesting device accessing the information that is stored at the network location; and cause the information to be updated based on the feedback regarding the digital media asset that is received from the requesting device.

13. The system of claim 12, wherein execution of the instructions by the processor causes the processor to further:

receive a passcode from the requesting device, wherein serving the information to the requesting device occurs in response to verification of the passcode.

14. The system of claim 12, wherein execution of the instructions by the processor causes the processor to:

generate a decrypted signature by decrypting an encrypted digital signature using a key, wherein the dataset associated with the digital media asset includes the encrypted digital signature, generate a hash based on the digital media asset, and verify that the hash matches the decrypted signature.

15. The system of claim 14, wherein execution of the instructions by the processor causes the processor to:

receive the key, wherein the key is a public key corresponding to the digital media asset, wherein the encrypted digital signature is encrypted by a private key corresponding to the public key.

16. The system of claim 14, wherein the information includes a certification that the digital media asset is unaltered based on the hash matching the decrypted signature.

17. The system of claim 12, wherein execution of the instructions by the processor causes the processor to further:

serve the information to a second requesting device after updating the information.

18. A non-transitory computer-readable storage medium, having embodied thereon a program executable by a processor to perform a method of media processing, the method comprising:

receiving a digital media asset captured by a media capture device and a dataset associated with the digital media asset;

generating a glyph that encodes a pointer to a network location, generating a modified digital media asset by overlaying the glyph on the digital media asset;

the modified digital media asset and information for storage at the network location;

receiving an indication that a requesting device has requested access to the information that is stored at the network location using the pointer encoded in the glyph of the modified digital media asset in response to output of the modified digital media asset;

receiving feedback regarding the digital media asset from the requesting device in response to the requesting device accessing the information that is stored at the network location; and causing the information to be updated based on the feedback regarding the digital media asset that is received from the requesting device.

* * * * *